(12) United States Patent
Wright et al.

(10) Patent No.: US 6,441,986 B1
(45) Date of Patent: Aug. 27, 2002

(54) SYSTEM AND METHOD FOR MINIMIZING WRITE-OVER ENCROACHMENT IN A DISK DUE TO RADIAL SINUSOIDAL RUNOUT AT THE FUNDAMENTAL FREQUENCY

(75) Inventors: Kelly D. Wright; Lawrence M. Moon; Yiping Ma, all of Layton; James M. Bero, Ogden, all of UT (US)

(73) Assignee: Iomega Corporation, UT (US)

(*) Notice: Subject to any disclaimer, the term of this patent is extended or adjusted under 35 U.S.C. 154(b) by 0 days.

(21) Appl. No.: 09/390,744

(22) Filed: Sep. 7, 1999

(51) Int. Cl.[7] ............................................. G11B 21/02
(52) U.S. Cl. ................................... 360/75; 360/77.04
(58) Field of Search ......................... 360/77.04, 78.09, 360/75, 31, 25, 53

(56) References Cited

U.S. PATENT DOCUMENTS

| | | | |
|---|---|---|---|
| 4,679,103 A | 7/1987 | Workman | 360/77 |
| 5,402,280 A | 3/1995 | Supino | 360/77.04 |
| 5,404,253 A | 4/1995 | Painter | 360/77.04 |
| 5,442,498 A | 8/1995 | Cheung et al. | 360/77.08 |
| 5,539,714 A | 7/1996 | Andrews, Jr. et al. | 369/44.26 |
| 5,550,685 A | 8/1996 | Drouin | 360/77.08 |
| 5,576,909 A | 11/1996 | Dierkes et al. | 360/78.09 |
| 5,585,976 A | 12/1996 | Pham | 360/77.04 |
| 5,587,785 A | 12/1996 | Kato et al. | 356/28.5 |
| 5,675,448 A | 10/1997 | Molstad et al. | 360/77.12 |
| 5,687,038 A | 11/1997 | Sugawara et al. | 360/77.08 |
| 5,793,559 A * | 8/1998 | Shepherd et al. | 360/77.04 X |
| 5,825,578 A * | 10/1998 | Shrinkle et al. | 360/77.04 X |
| 5,907,447 A * | 5/1999 | Yarmchuk et al. | 360/75 |
| 6,049,442 A * | 4/2000 | Fukushima et al. | 360/77.08 |

\* cited by examiner

Primary Examiner—David Hudspeth
Assistant Examiner—K. Wong
(74) Attorney, Agent, or Firm—Woodcock Washburn LLP

(57) ABSTRACT

A system and method for intentionally servowriting tracks having 1F runout on a data storage disk using a servowriter. The center of the servowriter hub is misaligned a predetermined distance with respect to the center of rotation of the servowriter spindle motor. The data storage disk is mounted on the spindle hub and tracks are servowritten on the disk surface. The tracks are misaligned with respect to the center of the servowriter hub to form 1F runout having a 1F peak amplitude and 2F runout having a 2F peak amplitude. The 1F peak amplitude is substantially equal to the predetermined distance, and the ratio of the 1F peak amplitude to 2F peak amplitude is at least about four.

25 Claims, 12 Drawing Sheets

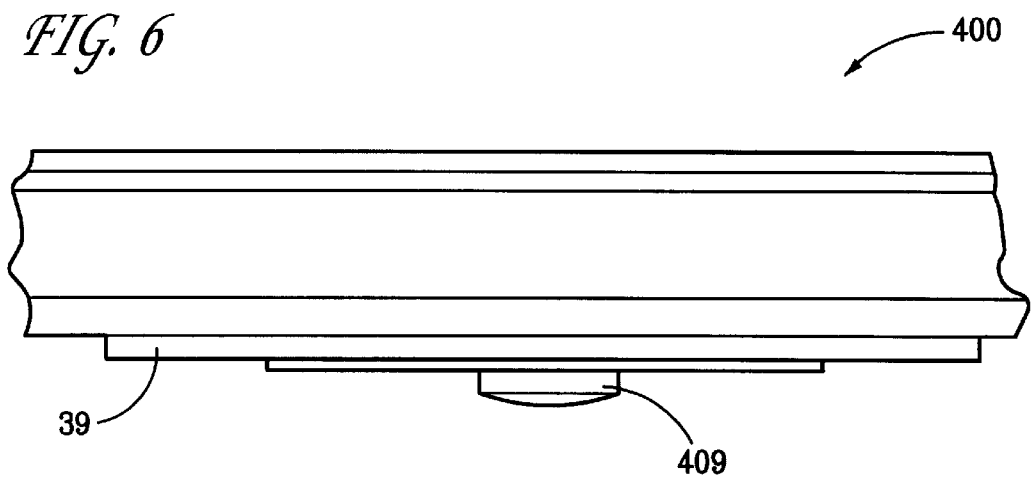
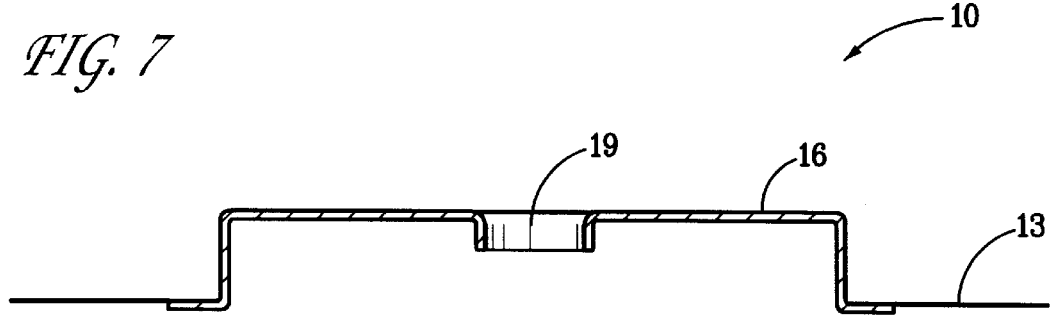
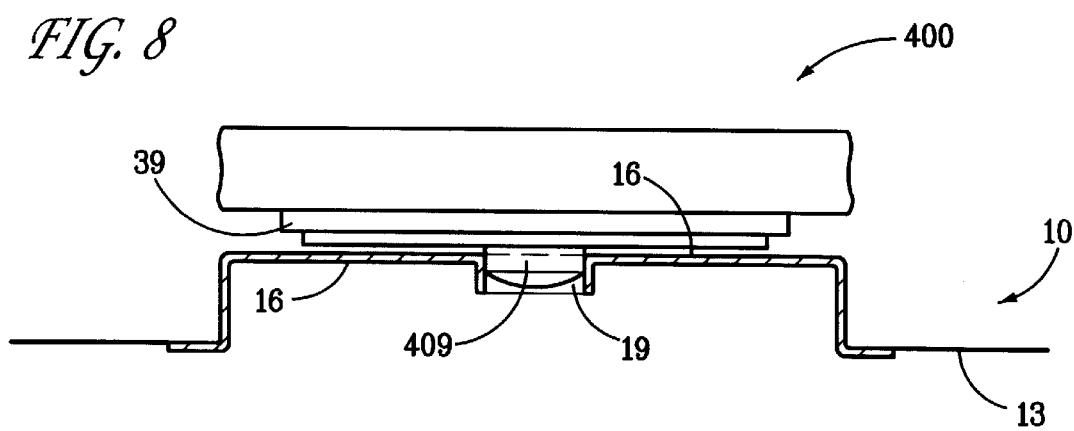

SYSTEM AND METHOD FOR MINIMIZING WRITE-OVER ENCROACHMENT IN A DISK DUE TO RADIAL SINUSOIDAL RUNOUT AT THE FUNDAMENTAL FREQUENCY

FIELD OF THE INVENTION

The present invention relates in general to disk drive data storage devices. More particularly, the present invention relates to methods for improving the tracking capabilities of a servo system for positioning a read/write head with respect to a track on a disk drive data storage device.

BACKGROUND OF THE INVENTION

In conventional compute data storage systems having a rotating storage medium, data is stored in a series of concentric or spiral tracks across the surface of a disk. Each track includes a number of data sectors. The storage medium can comprise, for example, a disk having a surface on which a magnetic material is deposited, such as conventional magnetic disks or magneto-optical disks. The data stored on a disk is represented as a series of variations in magnetic orientation of the disk magnetic material. The variations in magnetic orientation, generally comprising reversals of magnetic flux, represent binary digits of ones and zeroes that in turn represent data. The binary digits are read from the disk surface by a head transducer suspended over the disk surface that can detect the variations in magnetic orientation as the disk rotates relative to the head and generate a fluctuating data signal.

Conventionally, a magnetic head is mounted on an arm or carriage that is incorporated in a servo system that moves the head, via an actuator, in a "seek" or "access" function; i.e., the servo system moves the head to a selected track from a previous track. When the head reaches the desired track, the servo system commences a "track following" function in which it accurately positions the head over the centerline of the selected track and maintains it in that position so that the head can write a series of data bits or, alternatively, read a series of bits from the track as the disk rotates under the head. Thus, the disk drive servo control system controls movement of the arm across the surface of the disk to move the head from track to track and, once over a selected track, to maintain the magnetic head within a given tolerance of distance over the centerline of the desired data track during read or write operations.

One such system is a sectored servo control system that is used to maintain the magnetic read/write head precisely over a desired track during a read or write operation. Such a servo system requires that servo information be prerecorded on the disk file. Servo information can be prerecorded on servo sectors located on each disk surface.

During both seeking and track following operations, the prerecorded servo information is sensed by the head and demodulated to generate a digital gray code and a position error signal (PES). The digital gray code includes track identification information and the PES indicates the position of the head away from the centerline of the track (i.e., an offset from the center of the track). The digital gray code and the PES are combined together to generate a measured position signal. The measured position signal is then used in a servo feedback loop to generate a control signal to move the head along a desired seek trajectory or towards the centerline of the target track.

In other words, each disk stores servo information in different sectors of the disk required for positional control. The embedded sectored servo method reproduces servo information written on the disk to determine the track number and the exact position of the head relative to the center of the track. A description of a general digital disk file servo control system is given by U.S. Pat. No. 4,679,103 granted to Michael I. Workman and titled "Digital Servo Control System For a Data Recording Disk File".

Embedded servo bursts are angularly spaced pie-piece-shaped sectors that are interspersed among the data sectors on the data disks. Alternatively, the servo signals may be recorded on a disk surface dedicated to servo signals. All of these mechanisms for servo control information are well known to those of ordinary skill in the art. The prerecorded servo information is normally written as servo sectors or bursts to the disks by a device commonly referred to as a "servowriter" or "trackwriter" in a factory environment, before the disks are shipped to users. The servowriter is a machine dedicated to writing servo signals onto the disk's surface. After the servowriter has recorded the servo information in the servo sectors, the disk is checked for quality by verifying the accuracy of the servo information. All of these mechanisms for servo control information are well known to those of ordinary skill in the art.

When a disk is used in a disk drive, the prerecorded servo information, including servo bursts, is read from the disks, demodulated, and processed by the servo control system. The results are then applied to the input of the servo electronics which in turn controls the current to an actuator such as a voice coil motor (VCM) and thus controls the position of the head over the disk surface.

Conventionally, A/B servo bursts are recorded at regularly spaced angular intervals around the disk surface. The servo burst fields are written symmetrically offset from and on respective sides of the data track center line by at least one-half of the track width. That is, the servo bursts do not overlap the track center line. Consequently, the difference between the relative voltage amplitudes, $(V_A-V_B)$, as read by the head while track following, may be utilized as a direct indication of the distance and direction of the head from the track center line. In other words, when the drive head passes over these bursts, the readback amplitude of these bursts will be proportional to the portion of the width of the head that physically passes over the burst. For a head exactly on-track, both A and B bursts will read back with identical amplitude. If the head is biased toward the outside of the track, burst B will have higher amplitude than burst A, for example. If the head is biased toward the inside of the track, burst A will have higher amplitude, for example. By detecting the amplitude of A and B individually, and by calculating the difference between the amplitudes, the off-track PES signal can be generated.

Some disk drives accept removable disk cartridges that contain a magnetic storage medium upon which information can be written and read. The disk-shaped storage medium is mounted on a hub and both rotate freely as a unit within the cartridge. In order to rotate the disk, a spindle motor within the drive engages the disk hub when the cartridge is inserted into the drive. The spindle motor does this by first moving from an unloaded position to a loaded position when a disk cartridge is inserted into the disk drive. In the loaded position, the spindle of the disk drive motor contacts the hub of the disk cartridge. The spindle can then be rotated in order to rotate the hub and the storage medium of the disk cartridge. A shutter on the front edge of the cartridge is moved to the side during insertion into the drive, thereby exposing an opening through which the read/write heads of the drive move to access the recording surfaces of the rotating storage medium.

There are several causes for the position of a read/write head to be in error, or off-track, during a track following operation. One of the major components of head position error is called repeatable runout (RRO). RRO that occurs at the disk rotating frequency may be called 1F runout. There are several possible causes for 1F runout, such as an unbalanced spindle, a non-ideal spindle bearing, or centering error of a removable disk. The Workman U.S. Pat. No. 4,679,103 does not specifically deal with this problem. The servo control system disclosed in the Workman U.S. Pat. No. 4,679,103 does not have sufficient gain at the runout frequency to correct for the RRO error.

Particularly where a disk is removable from the drive, there is the possibility that the center of the circular tracks is not coincident with the center of the drive motor spindle, due to mechanical clearances causing a centering error. This causes a runout error or disturbance that is periodic at the frequency of the rotation of the disk, or 1F RRO. RRO can occur at various frequencies, such as 1F RRO or 2F RRO. It is typically desirable to reduce the runout.

In a feedback servo system that has finite loop gain at the 1F frequency, the sinusoidal 1F runout creates a sinusoidal off-track error that has an amplitude and phase relative to the amplitude and phase of the 1F runout. The 1F runout also has a phase with respect to the user data written on the disk's data tracks. Thus, the off-track error also has a phase with respect to the user data written on the data tracks. The amplitude and phase of both the 1F runout and its resultant off-track error has traditionally been a random function of several mechanical factors, particularly the centering of the disk hub on the spindle motor of the disk drive.

2F runout is caused by anisotropic hygroscopic and thermal expansion of flexible disk media. It should be noted that the amplitude of 2F runout is proportional to track radius whereas the amplitude of 1F runout typically is independent of the track radius.

When the 2F runout is large enough with respect to the 1F runout, during track following, the actuator mechanics experience additional directional reversals over one revolution (e.g., four directional reversals instead of the usual two). These addition directional reversals increase the likelihood and severity of write-over encroachment and off-track error.

Friction in the actuator mechanics also contributes to off-track error, particularly when the directional reversals of the actuator take place. Thus, off-track error is, among other things, a function of 1F runout, 2F runout, and friction. The off-track error is most severe when the amplitude of the 2F runout and friction is large with respect to the 1F runout.

Although the art of read/write head positioning is well developed, there remain some problems inherent in this technology, particularly induced friction and offtrack error. Therefore, a need exists for a servo method and system that overcomes the drawbacks of the prior art.

SUMMARY OF THE INVENTION

The present invention is directed to a system and method for servowriting tracks having intentionally servowritten 1F runout on a data storage disk using a servowriter. A method according to one embodiment of the invention comprises misaligning the center of the spindle hub of a servowriter a predetermined distance with respect to the center of rotation of the spindle motor; mounting a data storage disk on the spindle hub; spinning the data storage disk up to an operational speed; loading the read/write head onto a surface of the data storage disk; and writing tracks on the disk surface via the heads, the center of the tracks being misaligned with the center of the spindle hub to form 1F runout having a 1F peak amplitude.

According to one aspect of the invention, the predetermined distance is a function of 1F runout of the spindle motor, tolerance on the diameter of the disk hub hole, and tolerance on the diameter of the spindle hub. According to another aspect of the invention, the predetermined distance is sufficient to dominate over centering errors in mounting the disk to the spindle hub. Preferably, the 1F peak amplitude is substantially equal to the predetermined distance. According to another aspect of the invention, the ratio of the 1F peak amplitude to a maximum expected 2F peak amplitude is at least about four.

According to further aspects of the invention, servo bursts are written on a first portion of each track at an angular spacing that is smaller than an average spacing for the track and servo bursts are written on a second portion of each track at an angular spacing that is larger than the average spacing. Preferably, the angular spacing changes in a substantially sinusoidal fashion around each track. According to another aspect of the invention, the servo burst having the largest angular spacing is disposed at the point of the track where the largest track radius occurs with respect to the center of the hub.

Another embodiment in accordance with the present invention includes a system for intentionally servowriting 1F runout on a data storage disk having a disk hub assembly, comprising a spindle motor; a spindle hub coupled to the spindle motor on which the disk hub assembly is mounted, the center of the spindle hub being misaligned a predetermined distance with respect to the center of rotation of the spindle motor; a read/write head for writing tracks on a surface of the data storage disk; an arm connected to the read/write head for moving the read/write head across the surface of the data storage disk so that the tracks are misaligned with the center of the spindle hub to form 1F runout having a 1F peak amplitude; an actuator connected to the arm for controlling movement of the arm; and a controller for controlling the actuator.

Another embodiment in accordance with the present invention includes a data storage disk for use in a disk drive, comprising a magnetic storage medium having concentric tracks written thereon, each track having a predetermined amount of intentionally written 1F runout having a 1F peak amplitude; and a hub attached to the magnetic storage medium, the hub having a substantially circular hole in its center, for engaging a spindle motor hub in the disk drive, so that the magnetic storage medium is rotated in the disk drive.

The foregoing and other aspects of the present invention will become apparent from the following detailed description of the invention when considered in conjunction with the accompanying drawings.

BRIEF DESCRIPTION OF THE DRAWINGS

FIG. 6 is a diagrammatical view of a disk drive spindle motor hub that can be used with a preferred embodiment of this invention;

FIG. 7 is a cross-sectional view of the disk hub found in the cartridge of FIG. 1;

FIG. 8 is a diagrammatical view of a disk drive spindle motor hub that is engaged with a hub of a disk;

DESCRIPTION OF EXEMPLARY EMBODIMENTS AND BEST MODE

In accordance with the present invention, systems and methods for intentionally adding 1F runout on disks during the servowriting process, and the benefits thereof, will now be described with reference to the figures. It will be appreciated by those of ordinary skill in the art that the description given herein with respect to those figures is for exemplary purposes only and is not intended in any way to limit the scope of the invention. Moreover, example applications are used throughout the description wherein the present invention is employed in conjunction with a particular disk drive system. That disk drive system application is not intended to limit the invention, as the invention is equally applicable to other systems.

The present invention is directed to a data disk having intentional 1F runout and a system and method for adding 1F runout to a data disk at the servowriter. The intentional runout allows the phase of off-track errors to be primarily determined by characteristics contained permanently within the cartridge, thus reducing the problem of write-over encroachment of the data on neighboring tracks. The present invention reduces cost by being able to tolerate more motor spindle 1F runout. Moreover, the 2F runout problem that is described above is prevented. By intentionally generating a large 1F, an undesirable effect of 2F runout is made negligible. Thus, the read/write head remains properly aligned over the data during track following.

By way of background and so that this invention can be more readily understood, an overview of a disk and disk drive is provided.

DISK

Figure 1:
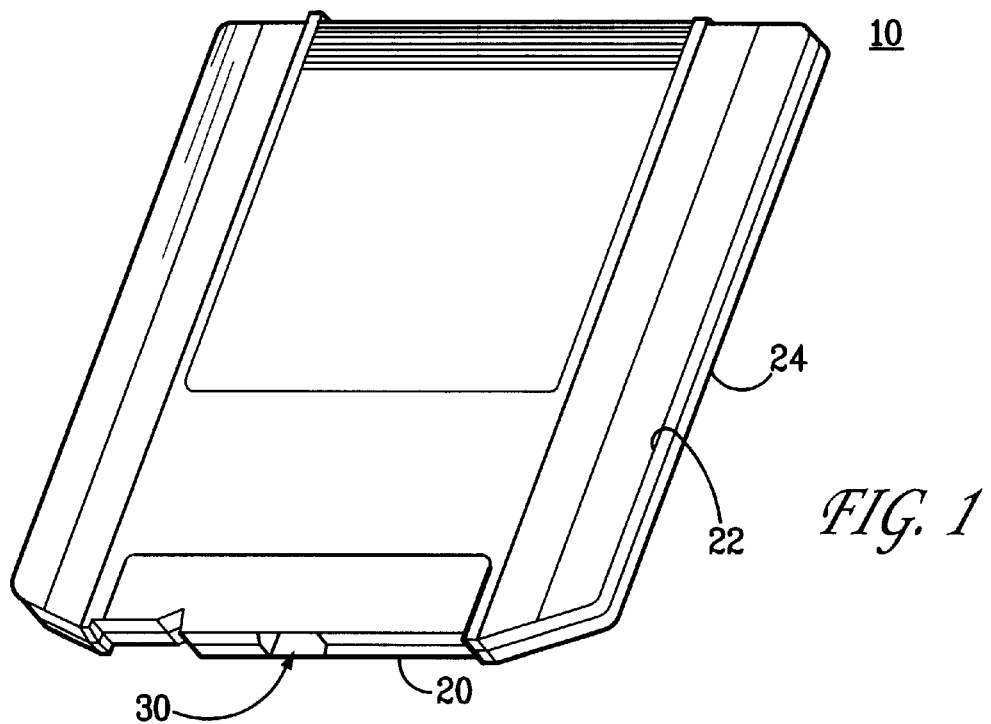
FIG. 1 depicts a disk cartridge adapted for use with a preferred embodiment of this invention.
Figure 2A:
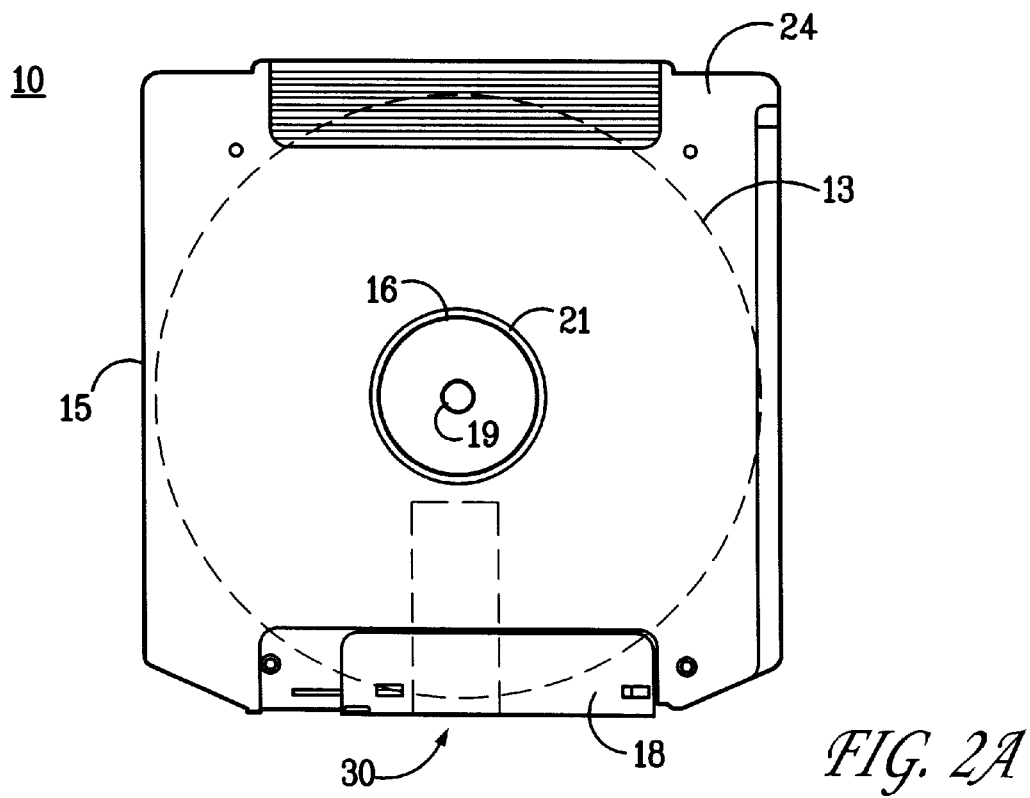
FIG. 2A is a bottom view of the disk cartridge of FIG. 1.
Figure 2B:
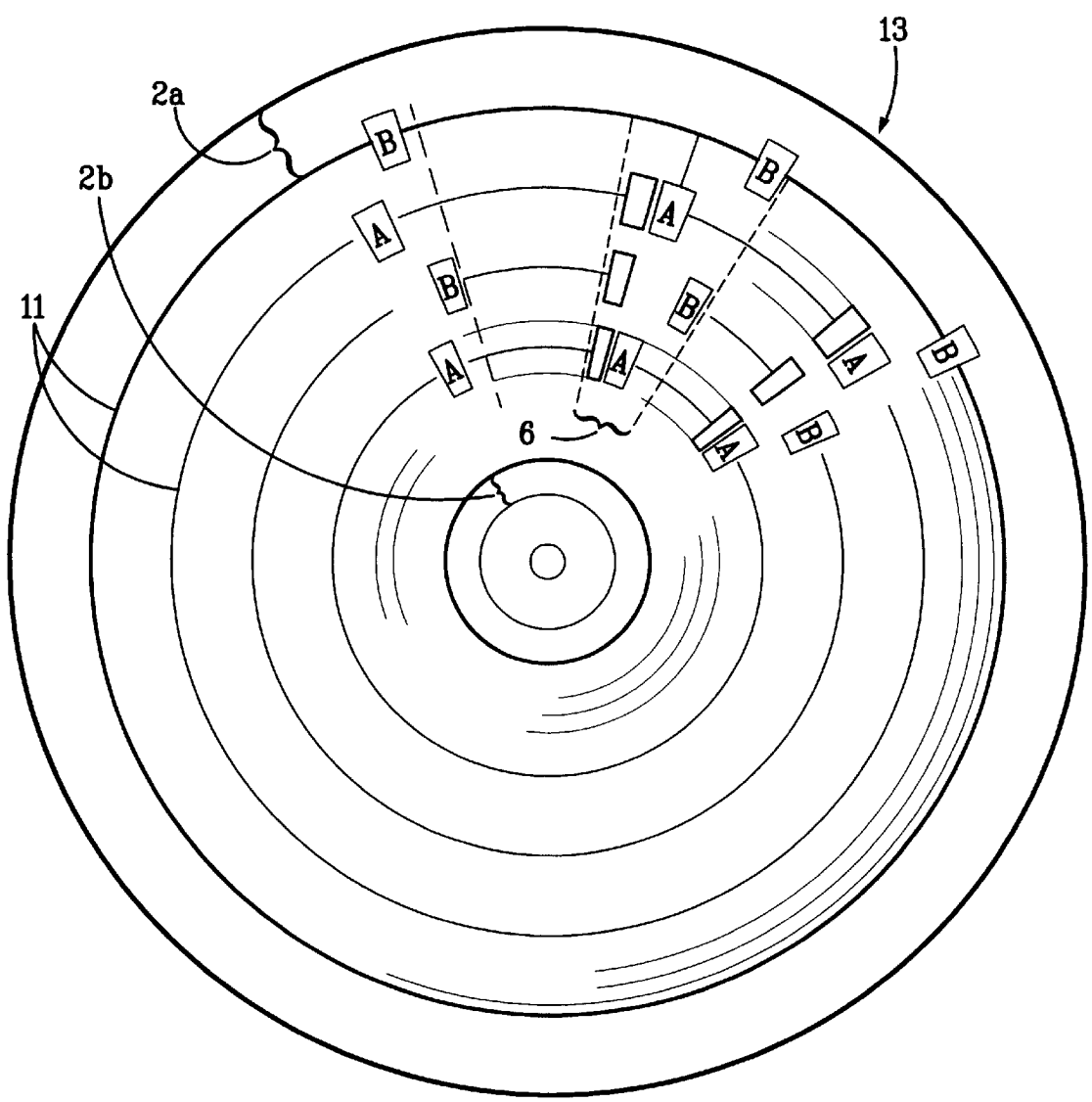
FIG. 2B depicts a magnetic disk and shows the location of format information.

FIGS. 1, 2A, and 2B depict an exemplary disk cartridge 10 and disk 13 adapted for use in the disk drive 12 (shown in FIG. 3) of this invention. In a preferred embodiment, the disk cartridge 10 may be a ZIP™, JAZ™, or CLIK!™ disk cartridge produced by Iomega Corporation. However, the disk cartridge 10 of this invention is not limited to these disk cartridges and a variety of other standard disk cartridges may be employed with various features of the disk drive of this invention. As shown, the exemplary disk cartridge 10 has an upper and a lower shell 22, 24 that mate to form an outer casing 15. In a preferred embodiment, the shells 22, 24 are plastic. Rotatably mounted in the casing 15 is a hub 16. There is a circular hole 19 in the center of the hub 16. A disk shaped information storage medium 13 is affixed to the hub 16 to create a disk hub assembly 13/16. In a preferred embodiment, the storage medium 13 is a flexible magnetic storage medium. However, in other embodiments, the storage medium may be a rigid magnetic disk, a magneto-optical disk, or an optical storage medium. An aperture 21 in the lower shell 22 of the casing 15 provides access to the disk hub 16. A head opening 30 in the front peripheral edge of the disk cartridge 10 provides access to the surfaces of the storage medium 13 for the read/write head(s) 38 of the disk drive 12.

As depicted in FIG. 2A, a shutter 18 is also provided on the front peripheral edge of the disk cartridge 10 to cover the head access opening 30 when the cartridge 10 is not in use. When a disk cartridge 10 is inserted into the disk drive 12, the shutter 18 moves to the side and exposes the head access opening 30. This provides access for the read/write heads 38 to the storage medium 13.

In order for the disk drive system to be able to access the magnetic disk or storage medium 13 and read from and write to the disk 13, the disk 13 must be servowritten and formatted. In particular, a number of concentric tracks 11 must be defined over the surface of the disk 13, as shown in FIG. 2B. These tracks 11 are defined by the use of servo sectors 6. Each track 11 has a plurality of servo sectors 6. A ZIP™ disk, for example, has 120 servo sectors 6 per track 11 or every three degrees. Thereafter, when the disk 13 is used by a disk drive, the disk drive read/write electronics can read the servo sectors 6 and use that information to precisely follow the tracks 11 via a servo-loop. The servo sectors 6 contain servo bursts or fields (e.g., the blocks labeled A and B) that are written onto the disk 13 to help maintain the read/write head on-track center during operation, as is understood by those skilled in the art.

Other information must also be written to the disk 13 before it can be used in a disk drive. For example, the disk 13 must be subdivided into good sectors and tracks and bad sectors and tracks. In the case of ZIP™ and JAZ™ disk cartridges, this information is placed onto a special track called the Z-track. Additionally, the disk 13 includes a plurality of guard band tracks 2 at the innermost 2b and outermost tracks 2a.

DISK DRIVE

Figure 3:
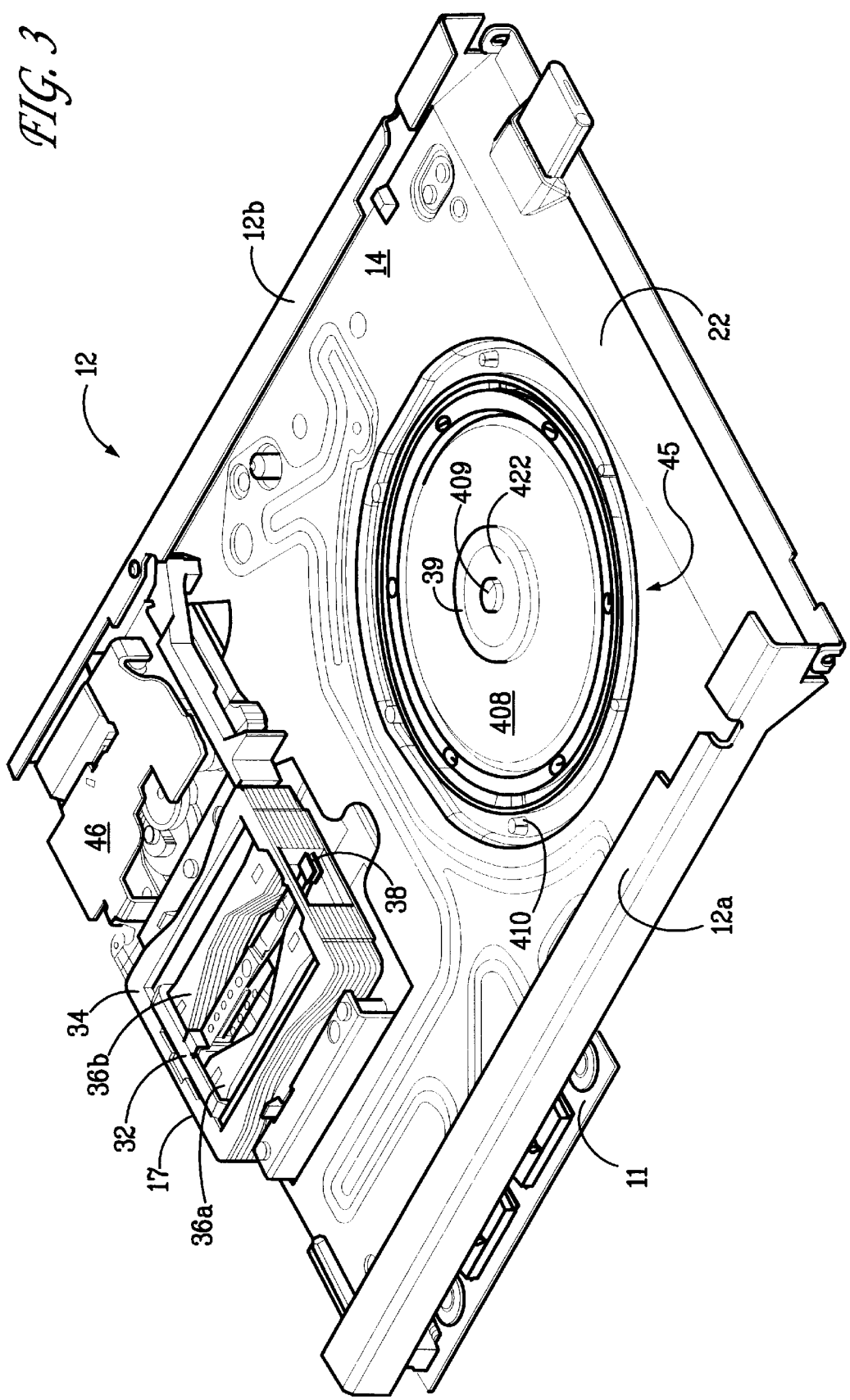
FIG. 3 is an isometric view of a top of a disk drive according to a preferred embodiment of this invention.
Figure 4:
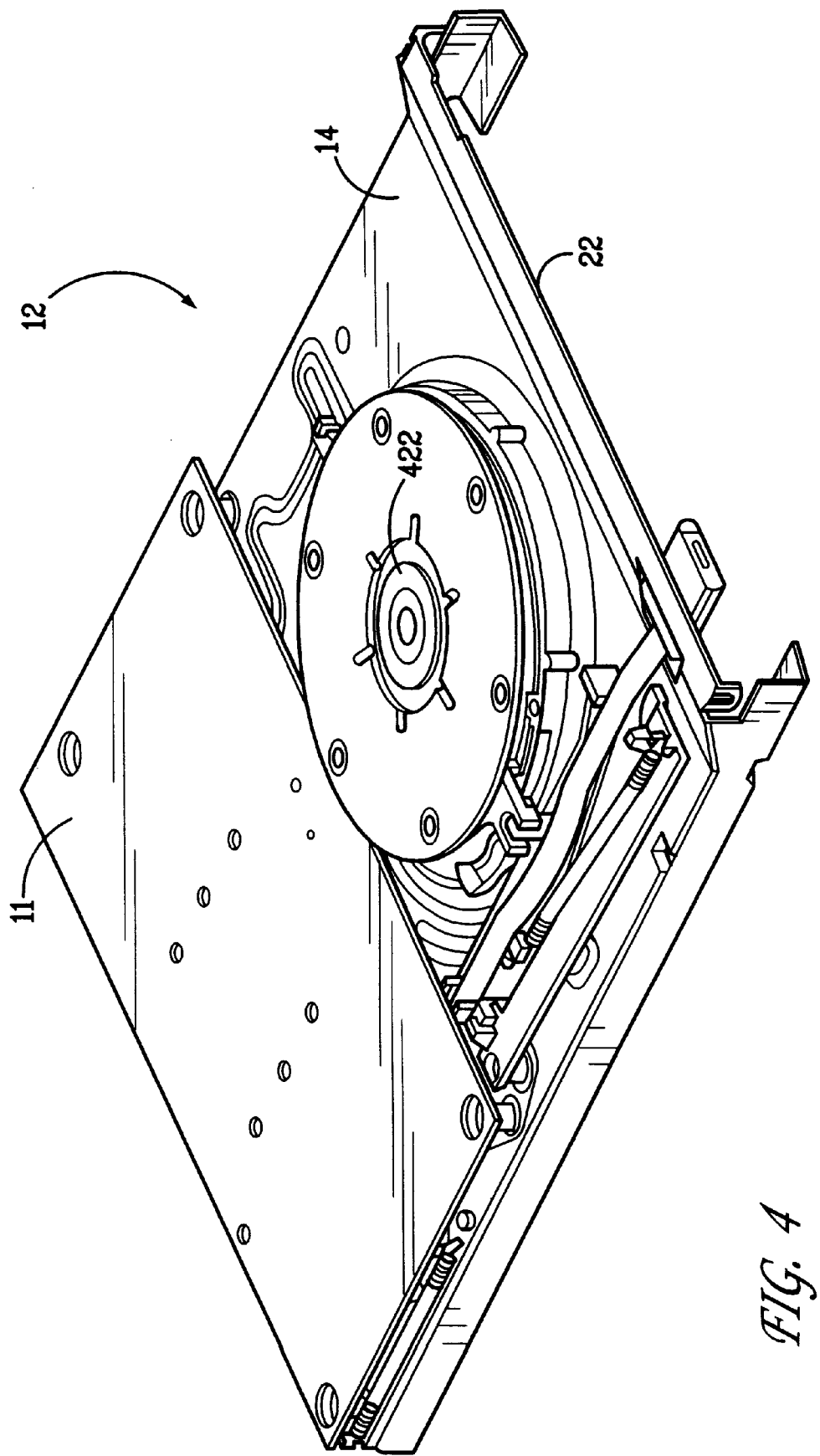
FIG. 4 is an isometric view of the bottom of the disk drive of FIG. 3 with a circuit board installed.
Figure 5:
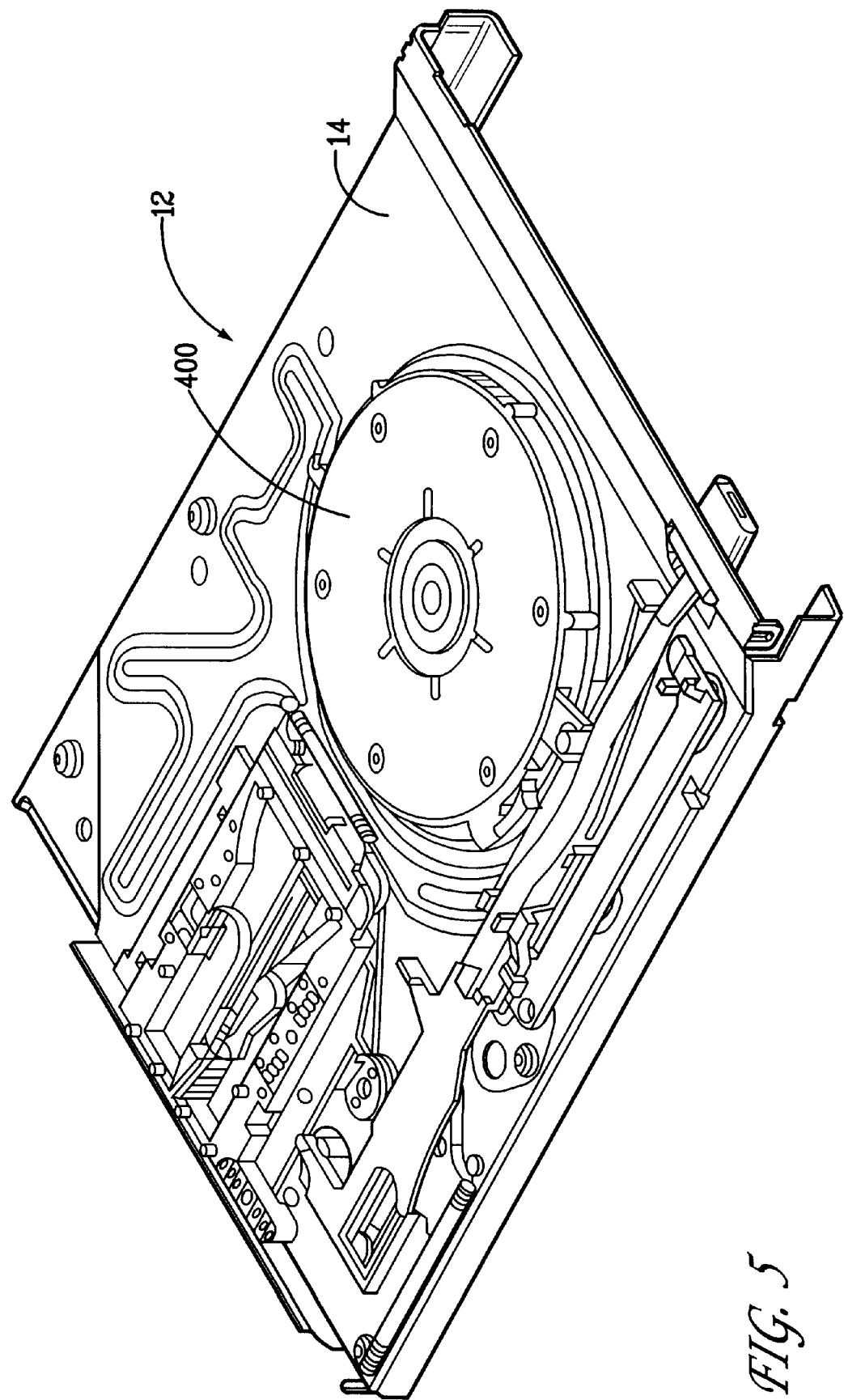
FIG. 5 is an isometric view of the bottom of the disk drive of FIG. 3 with the circuit board removed.

FIGS. 3–5 depict an exemplary disk drive 12 of the present invention. The disk drive 12 can be employed in either a stationary personal computer or a portable personal computer, such as a laptop computer. The methods of this invention can be used with any type of disk drive, including the type employed in a laptop computer, stand alone disk drives, and disk drives included within a casing, a slot or a bay, such as an office type computer.

FIG. 3 is a top isometric view of the disk drive 12 with the cover (not shown) of the disk drive removed. FIG. 4 is a bottom isometric view with a circuit board installed, and FIG. 5 is a bottom isometric view of the disk drive 12 with the circuit board removed. The disk drive 12 comprises a chassis 14 having u-shaped outer edges that form opposed guide rails 12a, 12b that guide a removable disk cartridge into the disk drive 12 through an opening 22.

The disk drive 12 also has a linear actuator 17 disposed at the rear of the chassis 14. The linear actuator 17 comprises a carriage assembly 32, an outer magnet return path assembly 34, and two inner return paths 36a, 36b disposed on opposite sides of the carriage assembly 32. After a disk cartridge 10 is inserted into the disk drive 12, the carriage assembly 32 carries a pair of read/write heads 38 over the recording surfaces of the disk-shaped storage medium 13 within the cartridge 10. A spindle motor 400 is provided on the floor of the chassis 14. During cartridge insertion, the motor 400 is translated vertically into engagement with a hub 16 of the disk cartridge 10, in order to rotate the disk-shaped storage medium at a relatively high speed. The circuit board 11, shown in FIG. 4, carries the drive circuitry.

DISK DRIVE MOTOR

By way of background and so that this invention can be more readily understood, an overview of the disk drive spindle motor 400 of the disk drive 12 is provided. This disk drive spindle motor 400 interacts with the hub 16 of a disk cartridge depicted in FIG. 2. The disk drive spindle motor 400 has a rotor 408 mounted on a rotatable shaft 409. In a preferred embodiment, the rotor 408 is attached to the shaft 409 with an interference fit, but other known methods of attachment may be used. A spindle motor hub 422 is also placed on the shaft 409 above the rotor 408 for engaging the hub 16 of a disk cartridge 10.

In the disk drive 12, the top of the motor shaft 409 takes the form of a dome as illustrated in FIG. 6. However, the top of the motor shaft 409 can be any shape, such as conical. From FIGS. 6 and 7, it is apparent that the motor shaft 409 can fit within the disk hub hole 19. When disposed within the hub hole 19, the motor shaft 409 can contact the hub 16, as shown in FIG. 8, and the hub 16 is detachably mounted on the spindle motor hub 422. Rotation of the motor rotor 408 will therefore cause rotation of the hub 16 and the storage medium 13. A magnet 39 on the disk drive rotor 408 is preferably used to pull the disk hub 16 towards the engaged position on the spindle motor hub 422.

Figure 9:
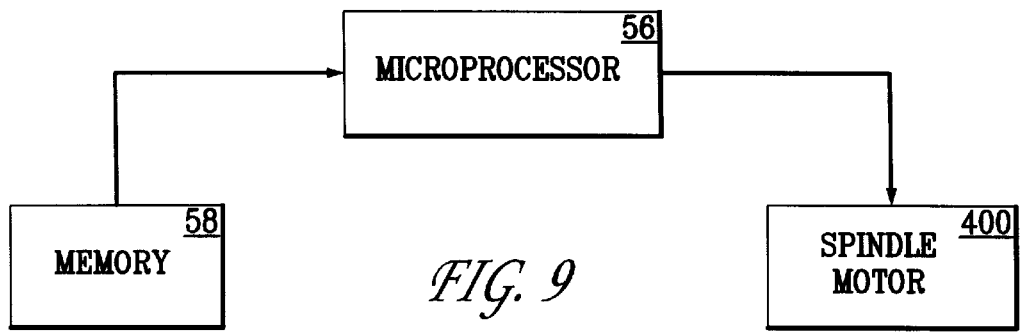
FIG. 9 is a schematic diagram of a system to drive the disk drive spindle motor.

Rotation of the rotor 408 is controlled by a microprocessor 56, which is in turn controlled by a computer memory or storage device 58 that contains programmed code and data, as shown in FIG. 9. After a disk cartridge 10 has been inserted into the disk drive 12, the microprocessor 56 sends power to the motor 400 to cause the rotor 408, and in particular, the disk hub assembly 13/16, to rotate. This is commonly referred to as motor "spin-up."

DISK ROTATION

As shown in FIG. 8, the motor shaft 409 is desirably centered on the disk hub hole 19 to rotate the disk hub assembly 13/16 properly. If the motor shaft 409 is not centered on the disk hub hole 19, the disk hub assembly 13/16 will not rotate in a circular pattern. Instead, the disk hub assembly 13/16 will rotate in a non-circular, off-centered pattern, which is undesirable. This causes the typically undesirable sinusoidal runout error or disturbance that is periodic at the frequency of the rotation of the disk, and is hence known as 1F runout. In accordance with the present invention, however, 1F runout is desirable and is not to be prevented or minimized.

Figure 10A:
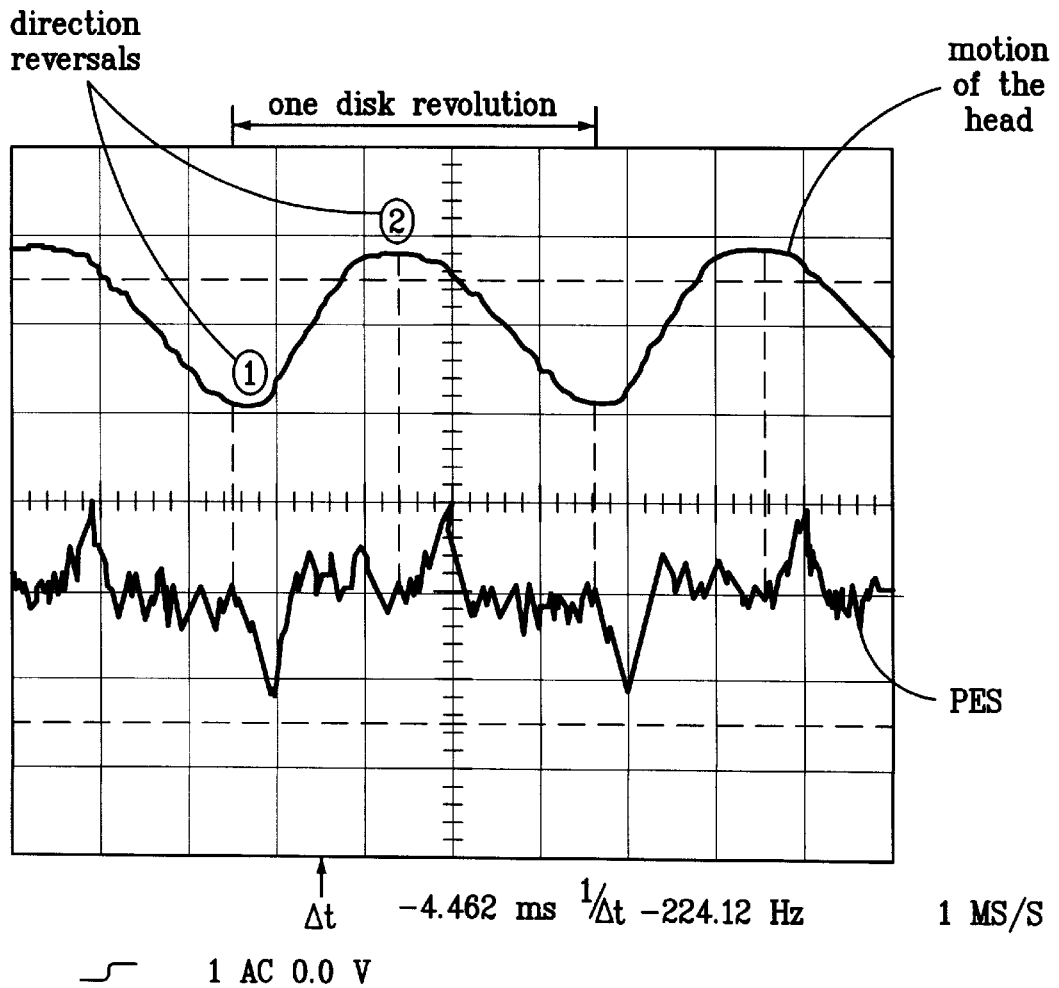
FIGS. 10A and 10B show graphs of 1F runout dominant head or actuator motion during track following.
Figure 10B:
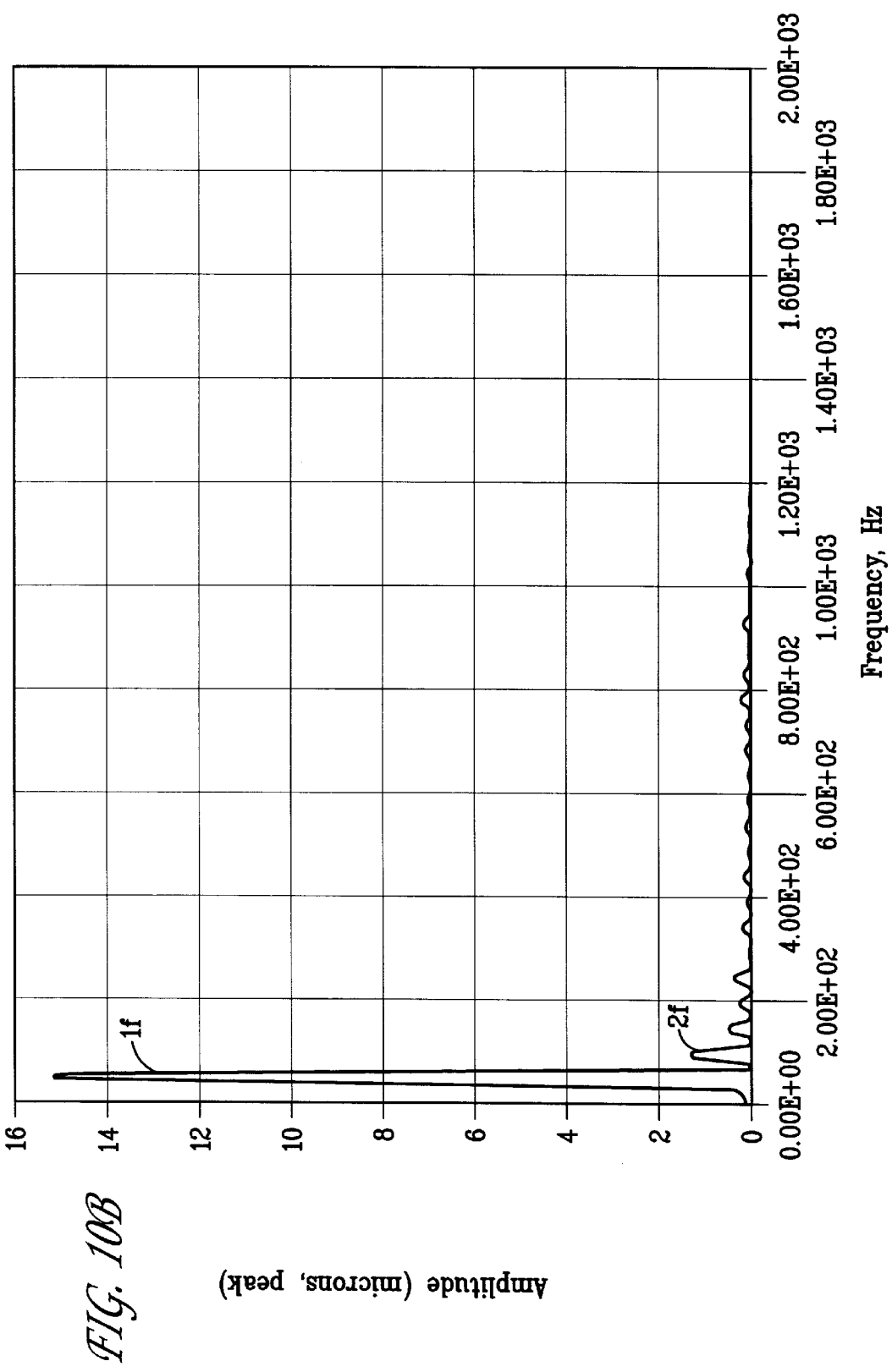

When 1F runout is dominant, PES and head motion are as shown in FIG. 10A. During track following, the actuator motion tends to stagnate at each of the two turnaround points as the feedback servo system attempts to follow the 1F runout and to overcome the sudden reversal in friction force associated with reversing the direction of the actuator motion, which leads to a characteristic PES peak or "friction PES bump". FIG. 10B shows the relative amplitudes of 1F and 2F. 1F runout is clearly dominant, and the ratio of 1F/2F is about 11.5.

As described above, 2F runout is caused by anisotropic hygroscopic and thermal expansion of the flexible disk media. When the 2F runout is large enough with respect to the 1F runout, the actuator mechanics experience additional directional reversals over one revolution (e.g., four directional reversals instead of the usual two). These addition directional reversals increase the likelihood and severity of write-over encroachment and off-track error.

Friction in the actuator mechanics also contributes to off-track error, particularly when the directional reversals of the actuator take place. Thus, off-track error is, among other things, a function of 1F runout, 2F runout, and friction. The off-track error is most severe when the amplitude of the 2F runout and friction is large with respect to the 1F runout.

Figure 11A:
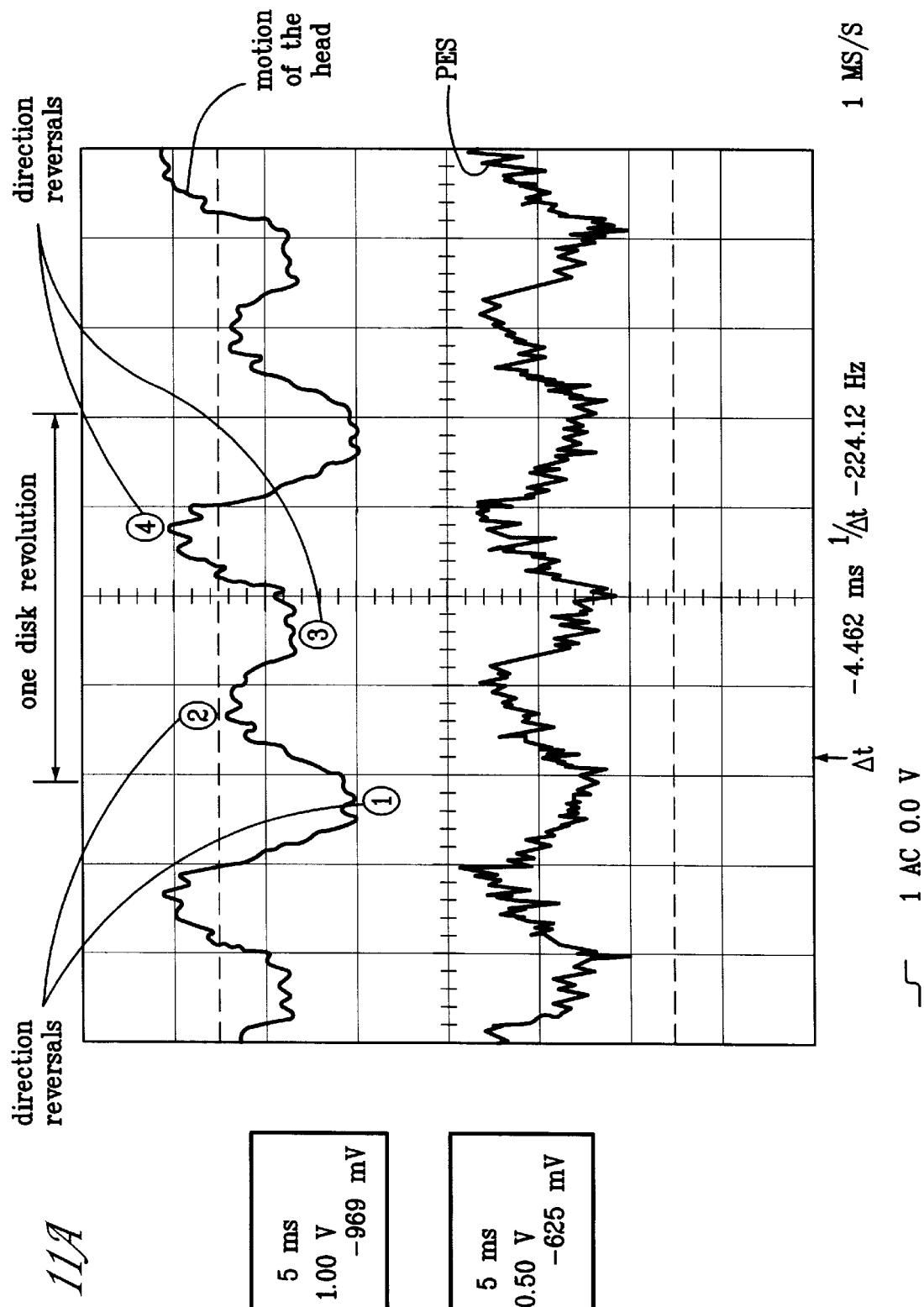
FIGS. 11A and 11B show graphs of a 2F runout dominant head or actuator motion during track following.

When 2F runout is dominant, PES and head motion are as shown in FIG. 11A. Four direction reversals of the actuator per disk revolution are shown in this case which leads to an almost pure 2F looking PES signal. The amplitude of the actuator motion is only about 3.5 microns (about 1 volt with 3.5 micron/volt sensitivity). The PES peaks coincide with the directional reversal in actuator motion and have the characteristic turnaround feature.

Figure 11B:
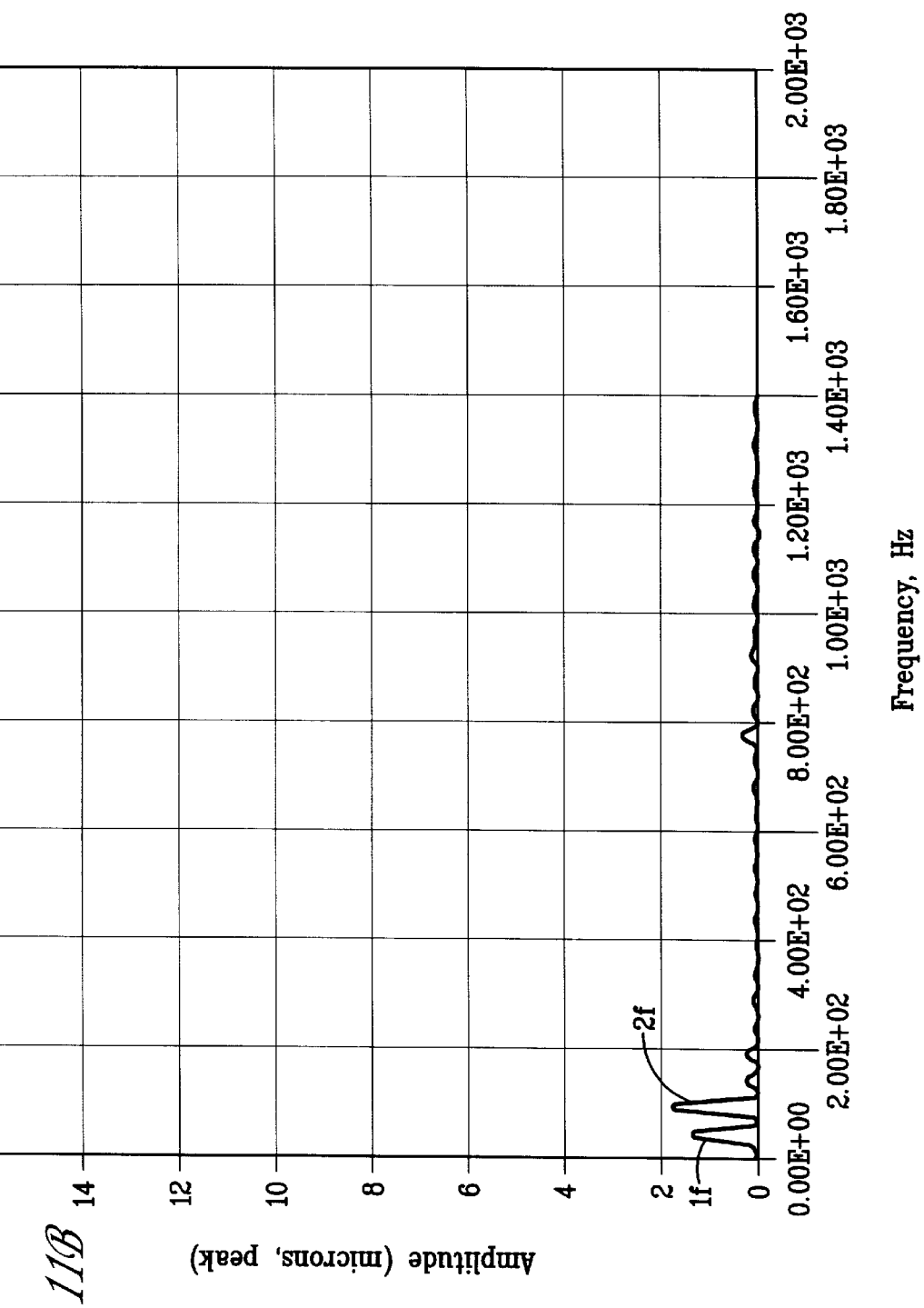

Therefore, the 1F runout amplitude is reduced substantially while the 2F runout amplitude remains substantially unchanged and is thus not significantly influenced by the alignment of the motor shaft 409 and the disk hub hole 19. FIG. 11B shows the 2F dominance. The 2F motion remains largely the same at about 1.8 microns because part of the 2F motion is overshadowed by friction. The ratio of 1F/2F amplitudes is about 0.8, which is much less than the inventor-determined critical ratio of about four that is needed to eliminate the undesirable 2F phenomenon.

Figure 12A:
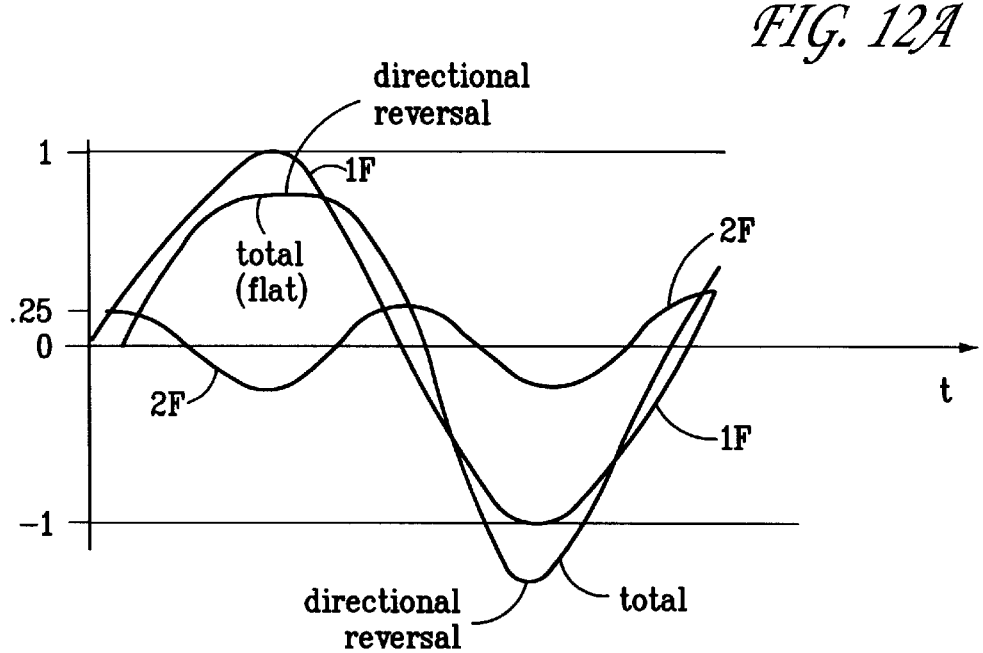
FIG. 12A shows a graph of amplitude vs. time for 1F runout, 2F runout, and the total (1F+2F) when 1F is in phase with 2F, and the ratio of 1F to 2F is about 4:1.

Thus, the inventors have determined that the occurrence of additional directional reversals depends on the ratio of 1F and 2F amplitudes in radial runout and the phase between the 1F and 2F components. When 1F is in phase with 2F, for example, four directional reversals in actuator motion can occur if 1F amplitude is not greater than about four times the 2F amplitude. FIG. 12A shows a graph of amplitude vs. time for 1F runout, 2F runout, and the total (1F+2F) when 1F is in phase with 2F, and the ratio of 1F to 2F is about 4:1. If there was any more 2F, or any less 1F, there would be more than the two directional reversals shown. The critical ratio of 1F and 2F amplitude is less than about four when 1F radial runout is not in phase with the 2F runout.

Figure 12B:
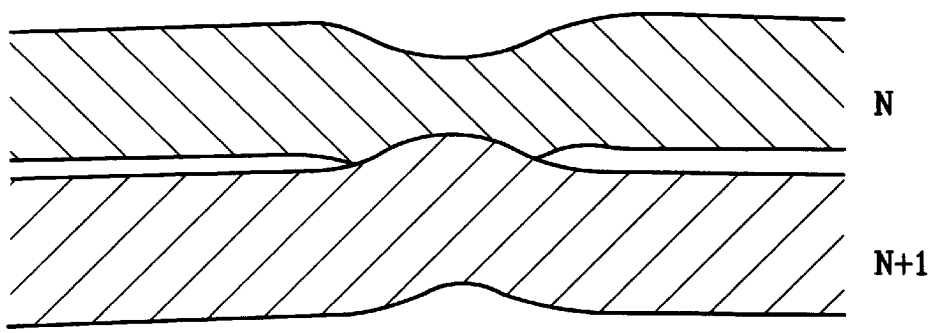
FIG. 12B shows two neighboring tracks in which data intended for one track N+1 overwrites data previously written on neighboring track N.
Figure 12C:
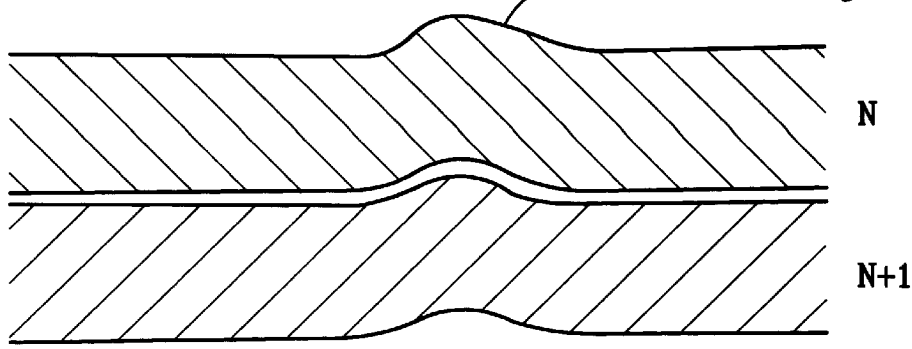
FIG. 12C shows two neighboring tracks with data written that is written off-track in phase in each neighboring track.

The inventors have determined that the 2F phenomenon is eliminated if a large enough 1F radial runout is present. Because the 1F runout is largely determined by hub center to motor spindle alignment, the 1F runout varies considerably with cartridge insertion and removal, making it difficult to predict. Because of this, off-track errors can occur, in which data intended for one track N+1 overwrites data previously written on a neighboring track N, as shown in FIG. 12B. The present invention is directed to increasing the 1F radial runout to eliminate the 2F problem, and to predetermine the phase of the 1F runout generated with respect to the data on the data track. In this manner, off-track errors remain phased with one another, so that off-track writing occurs in the same radial location on neighboring tracks N and N+1, as shown in FIG. 12C. It should be noted that 1F is typically considered undesirable and it is usually desirable to minimize 1F runout. In accordance with the present invention, however, 1F runout is desirable and intentionally generated.

SERVOWRITER

Figure 13:
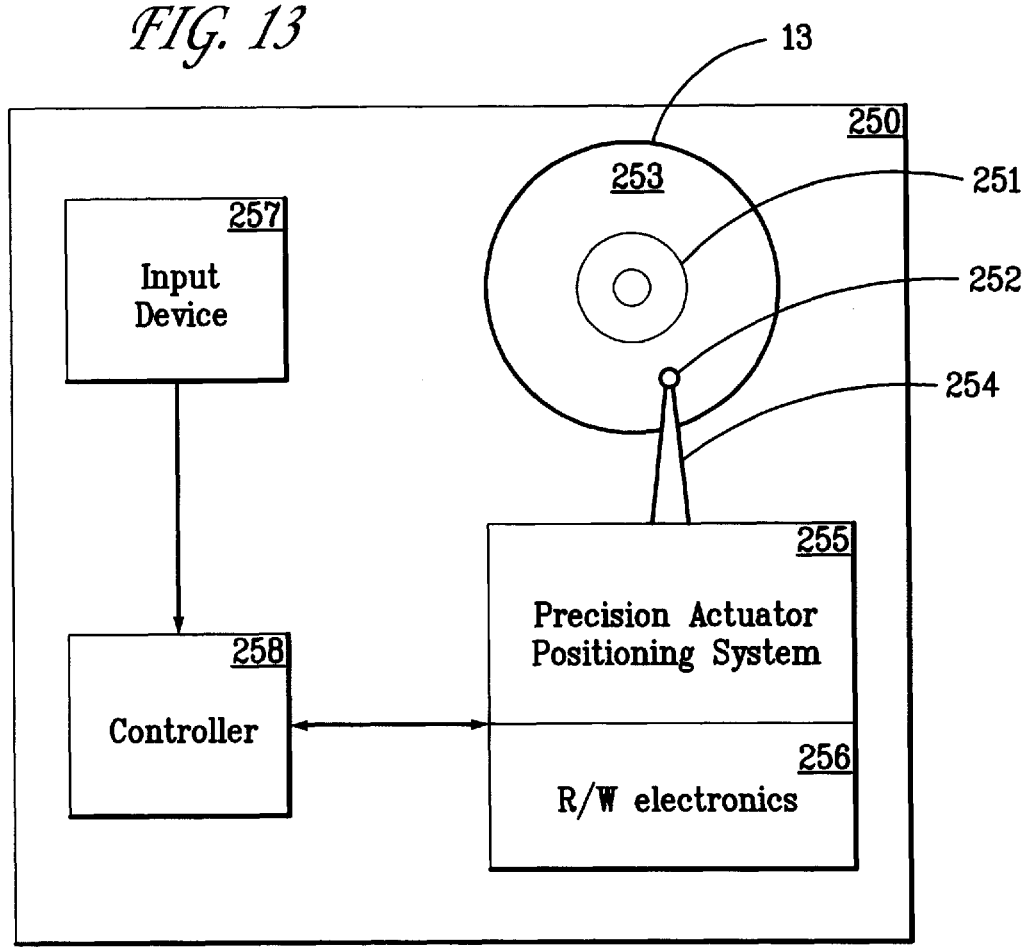
FIG. 13 is a block diagram of an exemplary servowriter system in accordance with the present invention.

In the case of ZIP™ and JAZ™ drive disks, as with many types of removable media disk cartridges, the format process is performed using a servowriter. As shown in FIG. 13, one step in the format process is performed by a servowriter 250. The servowriter 250 is a finely calibrated formatting device that creates the radial location of the tracks 11 by writing servo sectors 6 at precise radial and angular intervals on the surface of the disk 13. The major components of a servowriter 250 comprise a servowriter hub 251 for holding a disk hub assembly 13/16 and spinning it up to operational speed; a read/write head 252 for writing and reading servo information to and from the disk 13; an arm 254 for moving the head 252 across the disk surface; a precision actuator positioning system 255 for controlling movement of the arm 254; a controller 258 for executing and controlling the servowriting process; and read/write electronics 256 for translating the electromagnetic signals of the disk surface to and from a digital format that is understood by the controller 258. The disk hub assembly 13/16 is mounted on a servowriter hub 251 that is similar to the drive motor hub 422 described above with respect to FIG. 3. Additionally, the servowriter 250 comprises an input device 257, such as a keyboard, so that a servowriter operator can input information to control the servowriter process. Skilled artisans will appreciate that the servowriter 250 used to practice the present invention can be one of many commercially available units, such as Phase Metric/Helios MS 5000, appropriately modified to accept a particular variety of disk hub assemblies 13/16.

Operational data for each disk hub assembly 13/16 can be written onto the disks 13 during the servowriter process by the servowriter 250. The process of writing operational data to disks 13 at the servowriter 250 begins by mounting a disk hub assembly 13/16 on the servowriter hub 251, spinning the disk 13 up to operational speed, and loading the heads 252 onto the disk surface. After the heads 252 are loaded onto the disk surface, they begin to move across the surface writing tracks 11 and servo sectors 6 and embedding track identifiers within servo sectors 6 of tracks 11. The heads 252 continue this process moving across the entire disk surface until all the tracks 11 are written. Additionally, servowriter station identifiers could be written to each disk 13 and used to monitor the quality of each servowriter 250. Thereafter, a verifier (not shown) adds additional formatting information.

The servowriting process continues until all tracks 11 have been written. When the process is completed, the heads 252 are unloaded, the servowriter spindle motor 253 stops and the disk hub assembly 13/16 is removed. The formatted disk hub assemblies 13/16 are then transported to a verifier (not shown) where additional formatting information is written in the tracks 11, and they are quality tested.

As described above, one source of off-track error is 1F runout. The amplitude and phase of both the 1F runout and its resultant off-track error has traditionally been a random function of several mechanical factors, particularly the centering of the disk hub 16 on the drive spindle motor hub 422. The inventors have determined that if a sufficiently large amplitude 1F runout is intentionally servowritten into the disk at the time of disk manufacture, then this intentional 1F runout can be made dominant over all other cumulative runouts. Because the servowritten 1F runout stays permanently with the disk, the amplitude and phase between the off-track error and the user data can be permanently determined primarily by this intentionally servowritten 1F runout. In other words, in a removable media disk drive system, if the finite loop gain of the servo at 1F is consistent from drive to drive, then there will also be a consistent amplitude and phase relation between the 1F runout and its resultant off-track error. Because all tracks would then share a common 1F runout caused off-track error, this has the desirable result of eliminating or greatly reducing write-over encroachment of the data on neighboring tracks due to 1F runout caused off-track error, as shown in FIG. 12C.

Another source of off-track error is friction in the mechanics of the actuator 17 of the electromechanical servo system. The friction causes off-track error, particularly at the time of a reversal in the direction of motion of the actuator which moves the read/write head. 1F runout can cause two direction reversals per revolution of the disk. The inventors have determined that if the intentional 1F runout is made dominant over all other runout sources, then the phase with respect to the user data at which the friction caused off-track error occurs will also be determined primarily by the intentionally servowritten 1F runout. Thus, a similar desirable result of greatly reducing write-over encroachment due to the phasing of friction caused off-track may be obtained. It should be noted that the amplitude of the friction caused off-track will be primarily dependant on the magnitude of the actuator friction and the servo loop gain of a particular drive, both of which can be made to be substantially consistent from drive to drive. Moreover, with respect to flexible media, when sufficiently large amplitude 2F runout is present together with 1F runout, it can cause two additional read/write head direction reversals per revolution of the disk, or four reversals total per revolution. The inventors have determined that if the intentional 1F runout added at the servowriter is made to be dominant, then the number of direction reversals can be constrained to a maximum of two. This again has the desirable benefit of reducing write-over encroachment by controlling the phase of the off-track. This can also make possible simpler Repetitive Runout Cancellation (RRC) algorithms.

Thus, the present invention decreases data error probability due to overwriting of a neighboring track and makes it easier to implement RRC techniques. Furthermore, the present invention leads to cost savings in the drive spindle motor because less stringent drive motor repetitive runout specifications are needed.

Traditional disk drive servo techniques have focused on driving head to track positioning error as close to zero as possible. The inventors have determined that a modest amount of off-track error is not detrimental, and is in fact beneficial, as long as it is substantially the same for all of the tracks of the disk.

PREFERRED EMBODIMENT

As described above, a servowriter is used to intentionally write a significant amount of 1F runout into the tracks of the data disks before they leave the factory and go to the users.

Figure 14:
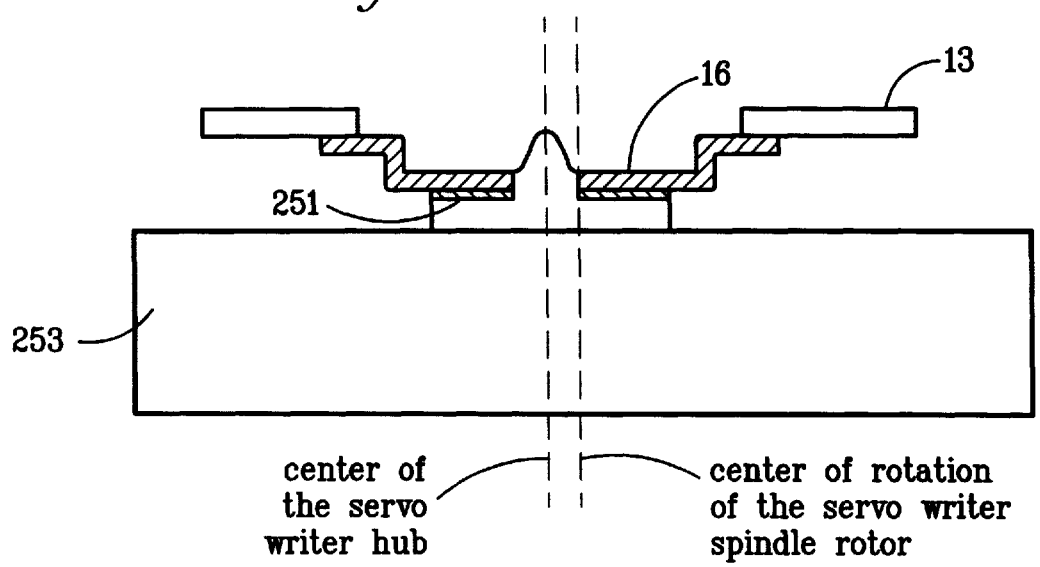
FIG. 14 is a cross-sectional view of an exemplary disk hub engaged with a servowriter spindle motor in accordance with the present invention.

A preferred embodiment of the present invention is described with respect to FIG. 14. The hub 16 is positioned on the servowriter hub 251 similar to the disk drive motor hub 422 described above. However, the center of the servowriter hub 251 is intentionally misaligned with respect to center of rotation of the servowriter spindle motor 253. This misalignment can be intentionally manufactured into the servowriter spindle. Thus, when a disk hub assembly 13/16 is spun by the servowriter spindle motor 253, this misalignment creates a corresponding equal second misalignment between the tracks 11 written on the disk 13 and the center of the disk hub hole 19. This second misalignment that is permanently and intentionally servowritten into the disk hub assembly 13/16 will manifest itself as 1F runout when the disk is used in a drive. The intentional 1F runout is preferably large enough to eliminate the problems described above.

The zero to peak amplitude of the intentional 1F runout is substantially equal to the separation distance between the center of rotation of the servowriter spindle motor 253 and the center of the servowriter hub 251. As the separation distance increases, the 1F runout increases. According to one aspect of the invention, the predetermined distance is a function of 1F runout of the spindle motor, tolerance on the diameter of the disk hub hole, and tolerance on the diameter of the spindle hub. According to another aspect of the invention, the predetermined distance is sufficient to dominate over centering errors in mounting the disk to the spindle hub. Preferably, the ratio of intentional 1F runout amplitude to 2F runout amplitude is at least about four. The inventors have determined that when this ratio is at least about four, no more than two reversals, described above, occur, regardless of the phase offset between the 1F and 2F runout.

Because the intentional 1F runout added at the servowriter is large with respect to typical drive motor 1F runout specifications, drive motor cost may be saved by relaxing the motor's 1F runout specification.

TIMING MODULATION

When 1F runout is present, the radius from the center of rotation of the disk to a point on a track where the read/write head is positioned will be modulated sinusoidally. Given constant angular velocity of both the servowriter spindle motor and spindle disk drive motor, the modulation of the radius created by track following the 1F runout creates a corresponding modulation of the tangential velocity of the storage medium moving under the head, thereby causing a sinusoidal modulation of the time intervals between servo bursts that were written on the servowriter at predetermined substantially equal time increments. The magnitude of the timing modulation is proportional to the magnitude of the 1F runout, and inversely proportional to the track radius. Thus, it is most pronounced at the inside tracks.

In accordance with one embodiment of the present invention, servo bursts are servowritten onto the disk storage medium in a manner to reduce the timing modulation when the disk is used in the drive. The present invention counter modulates the angular locations at which the servo bursts are servowritten onto the storage medium. In other words, on the servowriter, at one specific portion of a track, the servo bursts are written at an angular spacing that is slightly smaller than the average spacing for the entire track, and at a half revolution away, the servo bursts are written at an angular spacing that is slightly larger than the average spacing, preferably with the angular spacing changing in a substantially sinusoidal fashion around one entire revolution. The largest angular spacing is written at that point of a revolution where the largest track radius in the drive will occur. This has the effect of substantially canceling out the timing modulation described above.

Although the present invention has been described with respect to removable media disk drives, it is contemplated that the present invention can be used with non-removable media disk drives, particularly as track densities increase. It is contemplated and within the scope of the present invention that alternate phase patterns and alternate means of servowriting can be implemented without altering the invention herein described.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method for servowriting tracks having intentionally servowritten 1F runout on a data storage disk using a servowriter having a spindle motor, a spindle hub, and a read/write head, comprising:

misaligning the center of the spindle hub a predetermined distance with respect to the center of rotation of the spindle motor;

mounting the data storage disk on the spindle hub;

spinning the data storage disk up to an operational speed;

loading the read/write head onto a surface of the data storage disk; and writing tracks on the disk surface via the head, the center of the tracks being misaligned with the center of the spindle hub to form 1F runout having a 1F peak amplitude.

2. The method according to claim 1, wherein the predetermined distance is a function of 1F runout of the spindle motor, tolerance on the diameter of the disk hub hole, and tolerance on the diameter of the spindle hub.

3. The method according to claim 1, wherein the predetermined distance is sufficient to dominate over centering errors in mounting the disk to the spindle hub.

4. The method according to claim 1, wherein the 1F peak amplitude is substantially equal to the predetermined distance.

5. The method according to claim 1, wherein the ratio of the intentionally servowritten 1F peak amplitude to a maximum expected 2F peak amplitude of the disk is at least about four.

6. The method according to claim 1, further comprising writing servo bursts on a first portion of each track at an angular spacing that is smaller than an average spacing for the track and writing servo bursts on a second portion of each track at an angular spacing that is larger than the average spacing.

7. The method according to claim 6, further comprising changing the angular spacing in a substantially sinusoidal fashion around each track.

8. The method according to claim 6, further comprising writing the servo burst having the largest angular spacing at the point of the track where the largest track radius occurs with respect to the center of the disk hub.

9. A system for intentionally servowriting 1F runout on a data storage disk having a disk hub assembly, comprising:

a spindle motor;

a spindle hub coupled to the spindle motor on which the disk hub assembly is mounted, the center of the spindle hub being misaligned a predetermined distance with respect to the center of rotation of the spindle motor;

a read/write head for writing tracks on a surface of the data storage disk;

an arm connected to the read/write head for moving the read/write head across the surface of the data storage disk so that the center of the tracks are misaligned with the center of the spindle hub to form 1F runout having a 1F peak amplitude;

an actuator connected to the arm for controlling movement of the arm; and a controller for controlling the actuator.

10. The system according to claim 9, wherein the predetermined distance is a function of 1F runout of the spindle motor, tolerance on the diameter of the disk hub hole, and tolerance on the diameter of the spindle hub.

11. The system according to claim 9, wherein the predetermined distance is sufficient to dominate over centering errors in mounting the disk to the spindle hub.

12. The system according to claim 9, wherein the 1F peak amplitude is substantially equal to the predetermined distance.

13. The system according to claim 9, wherein the ratio of the intentionally servowritten 1F peak amplitude to a maximum expected 2F peak amplitude of the disk is at least about four.

14. The system according to claim 9, wherein the read/write head writes servo bursts on a first portion of each track at an angular spacing that is smaller than an average spacing for the track and writes servo bursts on a second portion of each track at an angular spacing that is larger than the average spacing.

15. The system according to claim 14, wherein the angular spacing changes in a substantially sinusoidal fashion around each track.

16. The system according to claim 14, wherein the read/write head writes the servo burst having the largest angular spacing at the point of the track where the largest track radius occurs with respect to the center of the disk hub.

17. A data storage disk for use in a disk drive, comprising:
a magnetic storage medium having concentric tracks written thereon, each track having a predetermined amount of intentionally written 1F runout having a 1F peak amplitude; and
a hub attached to the magnetic storage medium, the hub having a substantially circular hole in its center, for engaging a spindle motor hub in the disk drive, so that the magnetic storage medium is rotated in the disk drive.

18. The data storage disk according to claim 17, wherein the magnetic storage medium further comprises 2F runout having a 2F peak amplitude, and the 1F peak amplitude is sufficient to eliminate the effects of the 2F runout.

19. The data storage disk according to claim 17, wherein the ratio of the intentionally servowritten 1F peak amplitude to a maximum expected 2F peak amplitude of the disk is at least about four.

20. The data storage disk according to claim 17, wherein the 1F peak amplitude is a function of 1F runout of the spindle motor, tolerance on the diameter of the disk hub hole, and tolerance on the diameter of the spindle motor hub.

21. The data storage disk according to claim 17, wherein the 1F peak amplitude is sufficient to dominate over centering errors in mounting the disk to the spindle motor hub.

22. The data storage disk according to claim 17, wherein the intentionally servowritten 1F peak amplitude is sufficient to prevent more than two directional reversals in the disk drive during rotation of the magnetic storage medium in the disk drive.

23. The data storage disk according to claim 17, wherein each track has servo bursts written thereon at a first portion at an angular spacing that is smaller than an average spacing for the track and servo bursts written thereon at a second portion of each track at an angular spacing that is larger than the average spacing.

24. The data storage disk according to claim 23, wherein the angular spacing changes in a substantially sinusoidal fashion around each track.

25. The data storage disk according to claim 23, wherein the servo burst having the largest angular spacing is disposed at the point of the track where the largest track radius occurs with respect to the center of the hub.

* * * * *